July 16, 1963 E. F. PETERSON 3,097,537
VIBRATION-INDUCING APPARATUS
Filed Nov. 6, 1959
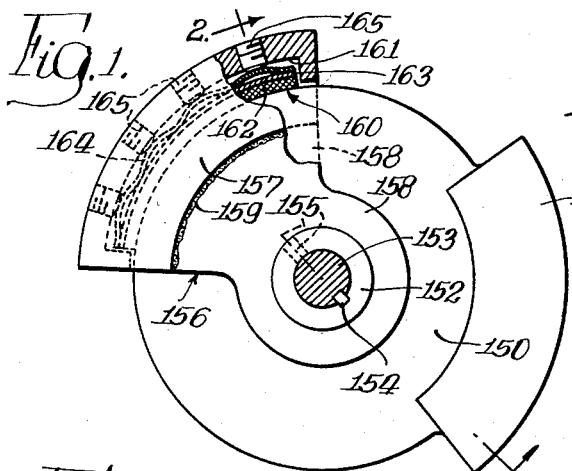
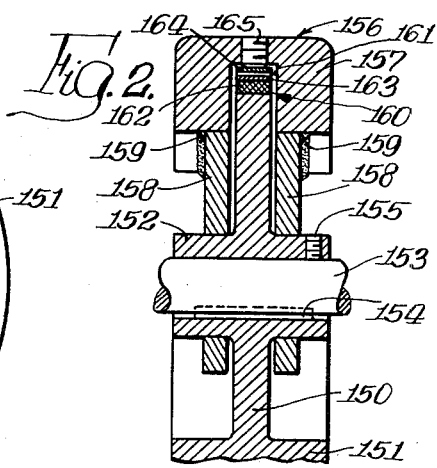
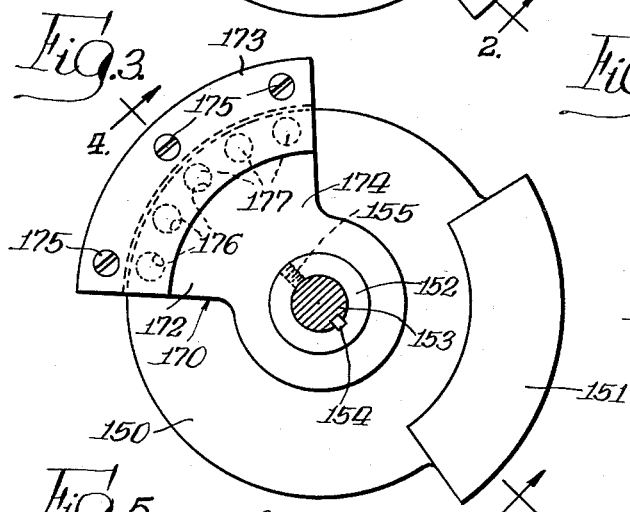
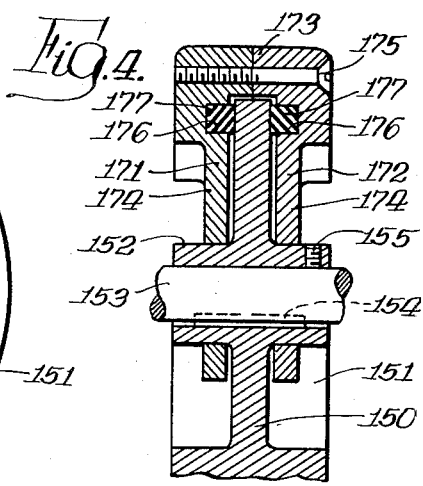
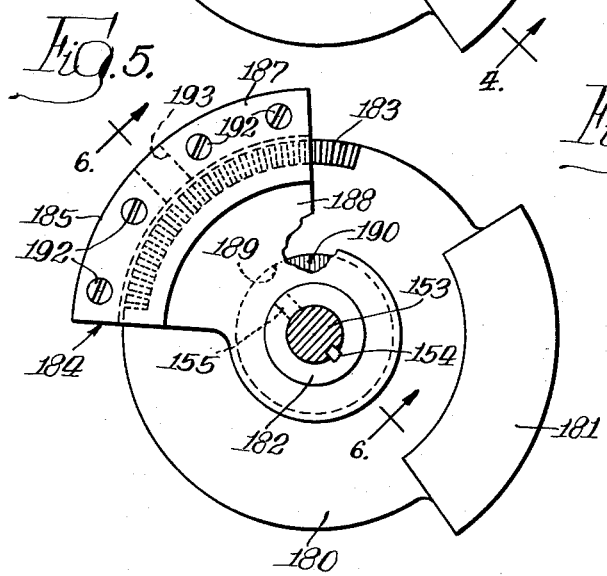
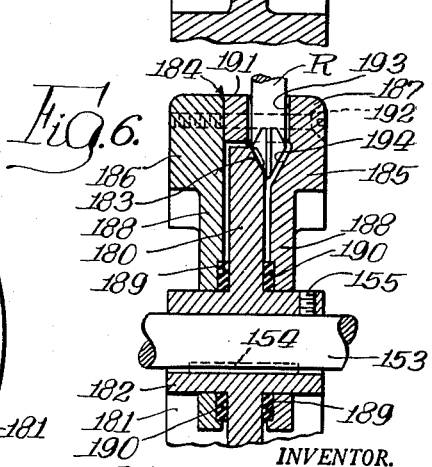
INVENTOR.
Edwin F. Peterson,
BY Brown, Jackson,
Boettcher & Dienner
Atty's.

3,097,537
Patented July 16, 1963

3,097,537
VIBRATION-INDUCING APPARATUS
Edwin F. Peterson, P.O. Box 191, Neponset, Ill.
Filed Nov. 6, 1959, Ser. No. 851,455
3 Claims. (Cl. 74—61)

The present invention relates to vibration-inducing apparatus and more particularly to such apparatus which is manually adjustable by resiliently frictional means for selectively varying the degree of vibration effected thereby.

Apparatus for inducing or generating vibrations has long been employed for many purposes, as for vibrating hoppers or chutes to assure flow of pulverulent or other flowable solid material therefrom or thereto, to compact such material in packaging thereof, to actuate picking tables and vibrating screens, and the like. Among the forms or types of such apparatus is the rotary vibration inducer, in which the vibratory result is accomplished by a fly-weight or other member having an eccentric center of mass. To provide for adjustment, this type of vibration-inducing apparatus may be formed with a pair of such members, one of which may be fast on a shaft and the other of which is bolted or otherwise secured to the first so as to rotate therewith, but in a manner allowing the second to be released and shifted relative to the first member so as to change the positions of the centers of the mass and thus selectively vary the amount of unbalance in the two-part adjustable assembly taken as a whole.

The major difficulty with such adjustable rotary type vibration inducers has been the difficulty involved in effecting the adjustment, because of the necessity for substantially disassembling and reassembling the mechanism. This is aggravated by the fact that the vibratory mechanism is almost without exception enclosed in a suitable casing, which must also be removed or disassembled and then replaced. Such adjustment arrangements result in a prolonged period of inoperativeness of the chute or other device to which the vibration-inducer is applied, when an adjustment of the vibratory mechanism is to be made. Attempts have been made to provide for adjustment of vibratory mechanisms even during operation thereof, but have proved impractical for vibration inducers such as those in general use in materials handling because of the relative complexity and resulting excessive cost of such devices.

Another problem in the present adjustable unbalanced weight devices is that adjustment can be made only in predetermined fixed steps, increments, or positions defined or controlled by bolting or detent holes or like means, and a non-graduated or stepless adjustment instead of such step-by-step adjustment cannot be achieved.

These problems are solved by the present invention, which provides a simple and effective resiliently pressing frictional arrangement which holds the two members against relative rotation, so that the centers of mass of the members are retained in the adjusted positions thereof, during operation of the vibration inducer, and yet allows a stepless or infinitely variable adjustment or change in the relative positions of the two centers of mass by manual operation of the members, thus permitting precise location of the resultant center of mass. The invention, furthermore, permits the adjustment of the members to be made from the exterior of the enclosing and protecting casing, so that removal of the casing is not necessary. The adjustment thus may be made very rapidly, since disassembly and reassembly of any parts of the vibration-inducing apparatus is absolutely unnecessary, the only requirement being that the arrangement allow sufficient rotational force to be applied manually to the members to overcome the resilient frictional holding reluctance, and effect relative rotation thereof.

It is an important object of the present invention to provide adjusting means for fly-weight members of rotary vibration inducers which effectively maintain the members against relative rotation during operation, but allow relative rotation thereof manually for adjustment of the relative positions of the members about the rotational axis.

Another object is the provision of rotary vibration inducers of the adjustable fly-weight member type in which resilient means exert pressure on the members to effect frictional holding thereof against relative rotation during operation, while permitting easy relative rotation thereof for non-graduated or stepless positional adjustment about the rotational axis by application of relatively light manual force.

Another object is the provision of vibration-inducing apparatus of the type described in which adjustment of the apparatus may be readily accomplished manually with the simplest tools and without any need to disassemble or reassemble any portion of the device.

Still another object is the provision of vibration-inducing apparatus of the type set forth, in which adjustment of the positions of the fly-weight members is easily and simply accomplished from the exterior of the casing or other enclosure of the apparatus.

Another object of the invention is the provision of vibration-inducing apparatus of the type described in which frictional material is resiliently pressed into engagement with at least one of the members with force sufficient to prevent relative rotation therebetween in operation of the apparatus, but insufficient to prevent relative rotation thereof by manual force to accomplish positional adjustment of the members.

Another object is the provision of a vibration-inducing device of the type described which allows smoothly variable, stepless, or non-graduated adjustment of the members so that any desired location of the resultant center of mass eccentric of the axis of rotation may be obtained.

A still further object of the invention is the provision of vibration-inducing apparatus of the type described employing a resiliently pressing frictional arrangement for holding in non-rotative adjusted position the fly-weight members thereof, in which means are provided to limit the maximum applicable pressure.

Other and further objects, advantages and features of the invention will be apparent to those skilled in the art from the following description, taken in conjunction with the accompanying drawings in which:

FIG. 1. is a side elevational view, partly broken away and in section, of one embodiment of vibration-inducing means according to the invention;

FIG. 2 is a cross-sectional view of the embodiment of FIG. 1, taken substantially as indicated by the line 2—2 of FIG. 1;

FIG. 3 is a side elevational view similar to FIG. 1, but illustrating a slightly different embodiment of such apparatus;

FIG. 4 is a cross-sectional view of the embodiment of FIG. 3 taken substantially as indicated by the line 4—4 in that figure;

FIG. 5 is a view similar to FIGS. 1 and 3, but showing another embodiment; and

FIG. 6 is a cross-sectional view taken substantially as indicated by the line 6—6 in FIG. 5.

Referring first to FIGS. 1 and 2, there is illustrated a vibrator construction incorporating the present invention, which comprises a pair of discs or other radially extending members mounted on a driving shaft. As specifically shown, a disc 150 eccentrically weighted as by an enlargement 151 thereof has a hub 152 which receives therethrough a shaft 153, to which it is locked by a key 154 so that the disc is held for rotation with the shaft, a set screw 155 or other appropriate means being employed to hold the disc against movement along the shaft. An eccentrically weighted member 156, which as best shown in FIG. 1 is of generally sectorial shape in side elevation, and as best shown in FIG. 2 is of channel or U-shape in cross-section, is provided with an unbalancing mass or weight 157 at its periphery, which defines the bottom of the channel or U in cross-section. A pair of plate or web members 158 extend radially inwardly from the mass or enlargement 157 in parallel relation to define the sides of the cross-sectional channel shape, the webs or plates 158 each being apertured to receive therethrough one end of the hub 152 of the disc 150. The disc 150 itself is bridged or spanned by the member 156, as best seen in FIG. 2. In the present instance, the plates 158 are shown as welded to the mass or enlargement 157 as at 159, so as to facilitate assembly of the member 156 on the disc 150, but it will be understood that any other appropriate manner of providing for such interrelation of the parts may be employed. The fit of the hub 152 in the apertures of the plates 158 of the member 156 is sufficiently loose to allow free relative rotation of the disc 150 and member 156.

Resiliently frictional means are provided acting between the member 156 and the edge of the disc 150, comprising a brake shoe generally indicated at 160, which is accommodated in a recess 161 formed in the bottom or bight portion of the mass or enlargement 157. The brake shoe comprises a layer of frictional material 162, much as brake lining or the like, which engages against to peripheral edge of the disc 150 and is provided with a relatively stiff backing member 163, such as a metallic strip. Resilient means are disposed between the backing member 163 and the bottom of the recess 161, such means in the present instance being illustrated as a resilient strip of wavy or corrugated form when viewed in side elevation, as clearly shown in FIG. 1, so that it bears on the backing member 163 at spaced points, and at alternately spaced points bears on the bottom of the recess 161. To adjust the pressure applied by the spring 164, the bottom or bight portion of the channel form member 156 is provided with a plurality of tapped bore extending radially of the shaft 153, in which adjusting screws 165 are threaded. The arrangement is such that each screw engages with one of the corrugations of the spring 164 which in the absence of the screws would bear against the bottom of recess 161. Projection of the screws radially inwardly of the recess bottom applies a compressive force to the spring which yieldably forces the friction material 162 against the edge of disc 150. To assure uniformity in the force applied to the spring at the various points, and also to indicate the maximum limit of spring force to be applied, the screws 165 are made of the same length sufficient to project inwardly of the recess 165 when the outer ends thereof are flush with the outer surfaces of the enlargement 157, and are screwed into the threaded bores until the outer ends are so disposed flush. Of course, the screw 165 might be provided with heads to limit the maximum projection thereof into the recess, or other means might be provided to limit the spring force and to assure uniform distribution of the spring pressure.

The resilient frictional engagement of the brake shoe 160 with the disc 150 is sufficient to prevent relative rotation of the disc 150 and weighted member 156 when the shaft is rotated. The maximum compression to which the brake shoe 160 may be subjected is, however, by reason of the limiting arrangement, not sufficiently great to prevent a manual rotation of the disc 150 and the weighted member 156 relative to each other. The positions of the unbalancing weights or enlargements 151 and 157 may thus be adjusted to vary the effective unbalance of the disc 150 and member 156 considered as a unit. The resilient pressure which it is necessary to apply so that friction prevents the relative rotation of the discs in operation of the vibrator while allowing manual rotative adjustment of the disc 150 and member 156 relative to each other is slight. One of the unbalancing weight enlargements 151 and 157, in this case enlargement 157, is of less mass than the other, so that even when the enlargements are disposed in diametrically opposed relation to each other there will be an unbalance of the two parts when considered as a unit. Thus it is impossible for the user or operator of the vibrator to set or adjust the device to a balanced condition, there always being at least the minimum unbalance provided by the difference between the two enlargements. Maximum unbalance, of course, is achieved by locating the two enlargements adjacent each other. Any desired degree of unbalance between the minimum and maximum may readily be obtained by shifting the disc 150 relative to the member 156 so that the two parts taken as a whole or as a single assembly are given a resultant center of mass corresponding to the desired degree of unbalance. Upon rotation of the shaft 153 and thereby of the disc 150 and member 156, vibrations results. The apparatus induces vibration because the rotation of the unbalanced parts, by reason of the unbalance, results in a vibratory effect on the shaft, which is transmitted to the member on which the vibrator is mounted. When it is desired to change the vibratory effect, the rotation is stopped and either the disc 150 or the weighted member 156 is held against movement while the other is rotated by manual means. This changes the relative position of the centers of mass, so that the resultant center of mass and therefore the degree of unbalance is changed. The adjustment may be accomplished from the exterior of the vibrator casing, when a casing is provided enclosing the vibrator, by reason of the frictional means employed. The casing may be suitably apertured to allow access to the vibrator parts either by the fingers or by any suitable manually operable tools, as for example the screwdriver R illustrated in FIGURE 6.

It will be apparent that the adjustment may be infinitely varied between the minimum and maximum vibration-inducing positions, or in other words the adjustment is smooth and non-graduated or stepless. Thus, any desired relative position of the two weighting enlargements or masses may readily be obtained, and it is not necessary to merely approximate the desired position by reason of step-by-step adjustment means being employed.

It may be pointed out that the structure of FIGS. 1 and 2 provides for an abutting relationship of the masses or enlargements 151 and 157 when the maximum vibratory effect is to be produced, which provides an easily ascertainable position for obtaining the resultant center of mass which produces the maximum vibration.

In FIGS. 3 and 4, there is illustrated another construction generally similar to that of FIGS. 1 and 2, but with certain specific differences. The disc 150 with the eccentric weighting enlargement 151 or the like is employed as in the preceding construction, with its hub 152 keyed to the shaft 153 and secured against movement therealong by the key 154 and set screw 155 already described. A radially extending member 170 generally similar to the member 156 employed in the construction of FIGS. 1 and 2 is provided, having a generally sectorial shape in side elevation and being of channel form in cross-section, as shown best in FIG. 4.

The member 170 is formed of two complementary halves 171 and 172 each of which is formed with half of a weighting mass or enlargement 173 and an integral side plate 174 extending radially inwardly to receive in a suitable aperature therein one of the oppositely extending end portions of the hub 152 of the disc 150, so that the disc and the member 170 may rotate relative to each other. The two halves 171 and 172 of the member 170 are secured together in any suitable manner, preferably by means such as the screws 175 which permit ready assembly and disassembly of the member and simplify assembly thereof on the disc 150, which as in the construction previously described is received between the plates 174. In the inner face of each half 171 and 172 of the member 170 there are formed a plurality of recesses 176 in each of which is disposed an insert or plug of resilient frictional material, such as a rubber plug 177, which projects from its recess to engage frictionally with the adjacent side face of the disc 150. The dimensions of the inserts 177 are such that each projects sufficiently out of its recess 176 to be somewhat compressed by its engagement with the disc 150, so that a resilient pressing force is applied between the disc and the member 170, the value of this force or pressure being of course such and to allow manual rotation of the member and disc relative to each other for adjustment of the resultant center of mass thereof, while preventing relative rotation of these parts when the shaft 153 is rotated in operation of the vibration-inducing apparatus. The maximum pressure is limited by the spacing of the side plates 174 from the disc 150, determined by the width of peripheral engaging portions of the halves 171 and 172, for any given extent of the inserts 177 axially of the disc 150 and member 170. The adjustment of the disc 150 and member 170 may be accomplished in substantially the same manner as in the case of the embodiment of FIGS. 1 and 2.

Another construction in which the present invention may be embodied is illustrated in FIGS. 5 and 6. A circular disc 180 is provided, generally similar to the disc 150 previously described, having a weighting mass or enlargement 181 at a portion of its periphery, and also having a hub 182 extending from both of its faces. The disc is mounted on a shaft 153, to which it is affixed by key 154 and set screw 155 in the same manner as described with the disc 150. One face of the disc 180 is formed with a beveled peripheral portion provided with a series of radially extending teeth 183. An eccentrically weighted, generally U-shaped member 184, similar to the member 173 illustrated in FIGURES 3 and 4, is formed of two cooperating parts 185 and 186. These parts 185 and 186 have enlarged portions which together define a peripheral eccentrically weighting mass or enlargement of the member 184 similar to the enlargement 173 of the member 170 of FIGS. 3 and 4. Each part 185 and 186 also has a side plate 188 which is slightly spaced from and overlies one face of the disc 180 and extends radially inwardly for a sufficient distance to receive one end of the hub 182 through an aperture therein, so that the member 184 is rotatably mounted on the hub of the disc 180, as in the case of the similar structures illustrated in FIGS. 1 and 3. A recess or groove 189 is formed in the inner face of each plate 188 about the hub-receiving aperture thereof, and an annulus 190 of resilient frictional material such as rubber is disposed in each of the recesses. The annuli 190 are of sufficient thickness to engage against the opposite faces of the disc 180 with a pressure sufficient to hold the disc 180 and member 184 against relative rotation in operation, but insufficient to prevent the adjusting relative rotation thereof by manual means.

The side plate 188 of the part 185 of the member 184 is shown as overlying the face of the disc 180 on which the teeth 183 are formed, while the plate 188 of the part 186 overlies the opposite face of the disc. The entire inner face of the part 186 including the plate 188, is flat, lying in a single plane, as will be obvious from FIG. 6. The part 185 has a transversely extending lip or bridging portion 191 which abuts the inner face of the part 186 adjacent the outer periphery thereof, and in effect provides the bight or bottom of the U-shaped member. The two parts 185 and 186 may be secured together in the assembled relation by any suitable means, such as welding along the adjoining peripheral edges thereof, although means providing for more ready disassembly thereof, such as the bolts 192 illustrated, may be preferable. Extending radially through the bridging portion 191 is a bore or other suitable aperture 193, centered substantially midway between the planes of the opposing faces of the disc 180 and the side plate 188 of the part 185. In the part 185, at the juncture of the bridging portion 191 and plate 188 and centered on the same axial plane as the aperture 193, is a conically-surfaced recess 194 having its deepest point adjacent such juncture and extending radially and axially inwardly therefrom, so that the recess 194 is substantially opposed to the beveled toothed portion 183 of the disc 180. Through the aperture 193 may be inserted the end of a screwdriver R for recessed head screws, such as a "Phillips"-head screwdriver having a tip configuration or formation to engage or mesh with the teeth 183 of the disc so that by rotation of the screwdriver the disc may be rotated in either direction relative to the member 184. The recess 194, as will be obvious, is of sufficient size to allow the reception of the tip of the screwdriver R within the member 184 without interference with the rotation thereof. It will be apparent that the engagement of the bridging portion 191 with the part 186 determines the maximum pressure developed by the annuli 190, for any combined thickness of the resilient material.

The toothed portion 183 on the disc 180 may extend for any desired distance along the periphery of the disc. As shown in FIG. 5, the extent of the toothed portion 183 is such as to allow relative rotation of the disc 180 and member 184 between the minimum and maximum adjusted positions, but in only one relative direction. It will be evident that if desired the toothed portion 183 might be extended so that either end of the eccentric weight portion 181 of disc 180 might be brought into abutting engagement with the member 184, or in other words the maximum eccentricity of the resultant center of mass of the disc 180 and member 184 might be obtained by rotating the disc in either direction relative to the member.

It will be evident that in the structures of FIGS. 3 and 5 the weighting enlargements or masses are in such relation that they may be brought into abutting engagement with each other, as in the case of the structure illustrated in FIG. 1, with the same advantageous result as described in connection therewith.

While I have illustrated and described what I regard to be preferred embodiments of my invention, nevertheless it will be understood that such are merely exemplary and that numerous modifications and rearrangements may be therein without departing from the essence of the invention.

I claim:

1. Vibration-inducing means comprising an operationally rotatable shaft, first and second radially extending members mounted on said shaft each having an enlarged peripheral portion locating the center of mass thereof eccentrically of said shaft, said first member being of plate-like form and said second member being of channel form receiving the first member therein and of appreciably less peripheral extent than the first member, one of said members being fixed for rotation with the shaft and the other being rotatable relative thereto, and means affording frictional engagement between said members and resiliently exerting pressure thereon sufficient to prevent relative rotation thereof upon operational rotation of the shaft but insufficient to prevent manual rotation thereof relative to each other for adjustment of said centers of mass.

2. In readily adjustable vibration-inducing apparatus of the class described, the combination of:
   (a) a motor-driven rotatable shaft,
   (b) a mounting hub rigidly keyed to said shaft to rotate therewith,
   (c) first and second vibration-inducing elements carried by said hub and having weighted portions locating the centers of mass of each of said elements eccentrically of said shaft,
   (d) said first vibration-inducing element comprising a plate-like circular driving web integral with said hub and extending radially outwardly from the intermediate portion of said mounting hub, (e) whereby the opposite end portions of said hub function as spaced external bearing surfaces projecting axially outwardly from the opposite sides of said driving web, (f) the weighted portion of said first vibration-inducing element comprising a weight sector formed integral with said driving web and extending over a limited angular span of the web periphery, (g) said weight sector being formed with portions of substantially equal mass projecting outwardly from the opposite sides of said driving web to result in said first vibration-inducing element being substantially axially balanced to each side of the median plane of said driving web, (h) said second vibration-inducing element being of stirrup-shaped form comprising a channel-shaped outer segment portion embracing the outer periphery of said driving web in spaced relation thereto, (i) said channel-shaped segment portion having mounting arms extending inwardly of said driving web, (j) bearing apertures formed in the inner ends of said mounting arms having rotatable bearing mounting on the external bearing surfaces of said mounting hub at opposite sides of said driving web, (k) the weighted portion of said second vibration-inducing element comprising a weight sector carried by said channel-shaped portion and formed with portions of substantially equal mass projecting outwardly from the opposite sides of said channel-shaped portion to result in said second vibration-inducing element being substantially axially balanced to each side of the median plane of said channel-shaped portion, (l) the weight sectors carried by said first and second vibration-inducing elements having a limited range of relative rotation in the same common plane of rotation extending transversely to the axis of said motor driven shaft, (m) frictional material mounted within said channel-shaped segment portion for bearing inwardly against the periphery of said circular driving web, and (n) spring means carried by said channel-shaped segment portion for exerting resilient pressure against said frictional material for holding said material pressed inwardly in frictional driving engagement against said driving web, (o) said frictional driving engagement of said frictional material constituting the sole driving connection between said first and second vibration-inducing elements in the motor driven rotation of said shaft.

3. Apparatus such as is specified in claim 2, wherein there is also provided adjustable screw means carried by said channel-shaped segment portion for varying the pressure of said spring means.

References Cited in the file of this patent

UNITED STATES PATENTS

| | | |
|---|---|---|
| 895,501 | Schaeffer | Aug. 11, 1908 |
| 1,797,840 | Schieferstein | Mar. 24, 1931 |
| 1,931,747 | Archer et al. | Oct. 24, 1933 |
| 1,943,076 | Jackson | Jan. 9, 1934 |
| 2,250,007 | Campion | July 22, 1941 |
| 2,294,448 | Coyle et al. | Sept. 1, 1942 |
| 2,380,770 | McFarland | July 31, 1945 |
| 2,512,735 | Beier | June 27, 1950 |
| 2,690,246 | Kelleigh | Sept. 28, 1954 |
| 2,753,703 | McIntyre | July 10, 1956 |
| 2,774,244 | Bergstrom et al. | Dec. 18, 1956 |
| 2,778,231 | De Gail | Jan. 22, 1957 |
| 2,852,946 | Petrin | Sept. 23, 1958 |
| 2,898,777 | Boehm | Aug. 11, 1959 |

FOREIGN PATENTS

| | | |
|---|---|---|
| 356,321 | Germany | July 20, 1922 |
| 106,589 | Australia | Feb. 8, 1939 |
| 256,063 | Switzerland | Feb. 16, 1949 |
| 733,467 | Great Britain | July 13, 1955 |
| 1,162,849 | France | Apr. 14, 1958 |
| 1,202,229 | France | July 1, 1959 |